(12) United States Patent
Schladt et al.

(10) Patent No.: US 12,009,526 B2
(45) Date of Patent: Jun. 11, 2024

(54) METHOD FOR PRODUCTION OF AN ELECTRODE AND THE ELECTRODE FOR A FUEL CELL

(71) Applicants: AUDI AG, Ingolstadt (DE);
Volkswagen AG, Wolfsburg (DE)

(72) Inventors: Thomas Schladt, Braunschweig (DE);
Lasse Schmidt, Wolfsburg (DE); Tanja Graf, Braunschweig (DE); Gerold Hübner, Braunschweig (DE); Jonathan Edward Müller, Gifhorn (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 492 days.

(21) Appl. No.: 17/425,693

(22) PCT Filed: Dec. 5, 2019

(86) PCT No.: PCT/EP2019/083761
§ 371 (c)(1),
(2) Date: Jul. 23, 2021

(87) PCT Pub. No.: WO2020/151865
PCT Pub. Date: Jul. 30, 2020

(65) Prior Publication Data
US 2022/0190354 A1 Jun. 16, 2022

(30) Foreign Application Priority Data
Jan. 25, 2019 (DE) ............... 10 2019 200 964.6

(51) Int. Cl.
*H01M 4/88* (2006.01)
*H01M 4/92* (2006.01)
*H01M 4/86* (2006.01)

(52) U.S. Cl.
CPC ........ *H01M 4/8892* (2013.01); *H01M 4/926* (2013.01); *H01M 4/8605* (2013.01); *H01M 4/8657* (2013.01)

(58) Field of Classification Search
None
See application file for complete search history.

(56) References Cited

U.S. PATENT DOCUMENTS

| 8,956,509 B2 | 2/2015 | Brault et al. |
| 2004/0185325 A1 | 9/2004 | Faguy et al. |

(Continued)

FOREIGN PATENT DOCUMENTS

| DE | 102007020947 A1 | 11/2008 |
| DE | 102013014841 A1 | 3/2014 |

(Continued)

OTHER PUBLICATIONS

International Search Report, dated Feb. 17, 2020, for International Application No. PCT/EP2019/083761, 4 pages.

(Continued)

*Primary Examiner* — Lucas J. O'Donnell
(74) *Attorney, Agent, or Firm* — Seed IP Law Group LLP (57) ABSTRACT

A method for the production of an electrode for a fuel cell is provided that comprises providing a multitude of catalyst particles carried on at least one electrically conductive particle carrier, and depositing one or more atomic or molecular layers of an ionomer from the gas phase on the catalyst particles and/or the at least one particle carrier, thereby forming a proton-conducting ionomer coating. Furthermore, an electrode for a fuel cell is also provided.

13 Claims, 10 Drawing Sheets

(56) References Cited

U.S. PATENT DOCUMENTS

| | | |
|---|---|---|
| 2005/0164072 A1 | 7/2005 | Yan et al. |
| 2013/0330651 A1 | 12/2013 | Thompsett et al. |
| 2014/0011119 A1 | 1/2014 | Lee |
| 2014/0088208 A1 | 3/2014 | Hodges et al. |

FOREIGN PATENT DOCUMENTS

| | | |
|---|---|---|
| DE | 102014102894 A1 | 9/2014 |
| DE | 102015114454 A1 | 3/2016 |
| DE | 102016203936 A1 | 9/2017 |
| EP | 1663515 B1 | 6/2013 |
| EP | 2882017 A1 | 6/2015 |
| JP | H1116584 A | 1/1999 |
| JP | 2009517824 A | 4/2009 |
| WO | 2007/075437 A2 | 7/2007 |
| WO | 2009/020735 A1 | 2/2009 |

OTHER PUBLICATIONS

International Preliminary Report on Patentability, dated Feb. 17, 2020, for International Application No. PCT/EP2019/083761, 7 pages.

METHOD FOR PRODUCTION OF AN ELECTRODE AND THE ELECTRODE FOR A FUEL CELL

BACKGROUND

Technical Field

Embodiments of the invention relate to a method for the production of an electrode for a fuel cell as well as the corresponding electrode.

Description of the Related Art

The electrodes of a fuel cell comprise catalysts formed from precious metals or precious metal alloys. Precious metals or alloys of platinum, palladium, ruthenium or the like are used for this. Therefore, in terms of the series manufacture of fuel cells, there is an effort to reduce the precious metal content of the catalyst fraction in the electrode.

If the precious metal load, especially the platinum load, is merely reduced in the known electrodes, the fuel cells outfitted with this will show a substantial drop in cell performance, especially a drop in the cell power, particularly when loads of 0.1 milligram of platinum per square centimeter of electrode surface (0.1 mg Pt/cm$^2$) or less are present. This power loss is attributed to the increase in the oxygen diffusion resistance at these low loads, which is due to an inadequate oxygen supply for the reaction zone around the precious metal catalyst.

In order to facilitate the supply of oxygen to the reaction zone, it is known how to modify the ionomer binder present in the electrode by a suitable choice of polymers having short side chains or having a different density of sulfonic acid groups, which influence the swelling ability of the ionomer binder in the electrode.

The binding of the catalyst particles to the proton-conducting ionomer is critical to the performance of the fuel cells. The usual methods for the production of fuel cell electrodes from catalyst particles and proton-conducting ionomers today are based on wet-chemical techniques and therefore a statistical distribution of the ionomer and a covering of the catalyst particles by the ionomer. One example of such a wet-chemical preparation will be found in DE 10 2015 114 454 A1. DE 10 2014 102 894 A1 also presents a wet-chemical method for the forming of an enhanced electrode arrangement. Such wet-chemical production methods may result in defects or inadequate covering and thus inadequate binding of the ionomer, which becomes especially evident when a high current density is demanded of the fuel cell, so that all or nearly all transport pathways for reaction media, product water, as well as electrons and protons are utilized.

BRIEF SUMMARY

The present disclosure provides a method for the production of an electrode and a corresponding electrode which reduce the aforementioned shortcomings.

The method for the production of an electrode for a fuel cell, especially for a polymer electrolyte membrane fuel cell (PEM fuel cell) involves the following steps:
  providing of a multitude of catalyst particles carried on at least one electrically conductive particle carrier,
  deposition of one or more atomic or molecular layers of an ionomer from the gas phase on the catalyst particles and/or the at least one particle carrier, thereby forming a proton-conducting ionomer coating.

This comes with the advantage that now no wet-chemical method is used to form the coating with an ionomer, which might result in a nonuniform coating. In this case, an atomic or molecular layer growth is brought about on the particle carrier or the catalyst particles, so that a homogeneous and uniform coating with the proton-conducting ionomers exists. In this way, an optimized ionomer catalyst structure is created for electrochemical electrodes, resulting in a high-performance (PEM) fuel cell.

Some embodiments may provide a layer by layer deposition of the ionomer coating by means of a cycle of a chemical gas phase deposition, especially by means of a cycle of a molecular layer deposition (MLD). In molecular layer deposition (MLD), the monomers of the desired ionomer are deposited from the gas phase as a single molecular layer on the base body, i.e., the catalyst material, and then polymerized. This process is repeated as often as desired, the layer thickness being increased by one molecular layer after each cycle. The desired ionomer layer thickness can be specifically adjusted by the number of MLD cycles.

In order to assure an improved transport of the reactants, the product water, the protons and the electrons on or near the electrode, it has proven to be advisable to carry out in addition the following steps during the production of the electrode:
  deposition of atoms or molecules of at least one passivation reactant on the surface of the catalyst particles, thereby forming at least one passivated region on the surface of the catalyst particles prior to forming the proton-conducting ionomer coating,
  deposition of the proton-conducting ionomer coating away from the at least one passivated region of the surface of the catalyst particle, and
  removal of the at least one passivation reactant from the catalyst particles, thereby forming the proton-conducting ionomer coating having a porosity, especially a predetermined or predeterminable porosity.

During the passivation, that is, the deposition of the passivation reactant on the surface of the catalyst particles, the chemical attribute of precious metals or precious metal compounds is utilized, namely, to form rather strong chemical bonds with certain molecules, which are known as catalyst poisons. By introducing or applying such substances from the gas phase, the surface of the precious metal catalyst is covered specifically, so that in the following step no ionomer molecules can be adsorbed at the sites occupied by the passivation reactant. After the complete application of the ionomer coating, the passivating substance is then removed from the precious metal surface, so that defects remain or occur in the ionomer coating at the place where the passivating substance was previously present. These defects produce pores or channels by which the surface of the catalyst particle remains accessible to reactants.

The place where the passivation reactant adheres to the surface of the catalyst particle is dependent on the surface energy, the chosen passivation reactant occupying each time the most energetically favorable "site" for it on the surface of the catalyst particle. The at least one passivation reactant may be chosen from a group comprising carbon monoxide (CO), cyanide ions (CN—, such as from a decomposition of HCN, or from a decomposition of an organic or an inorganic cyanide compound), thiocyanate (SCN—), isothiocyanate (NCS—), sulfide (R—S—, or S$^{2-}$), hydrogen sulfide (H$_2$S), primary, secondary, tertiary amine (R—NH$_2$, R,R'—NH, R,R',R"—N) and ammonia (NH$_3$). The use of these passivation reactants will mean that proton-conducting ionomers deposited from the gas phase will find their most energetically favorable site on regions of the particle carrier and/or the catalyst particle, since the sites provided by the passivation reactant are energetically unfavorable for them. Or in other words: sites are already occupied by the passivation reactant that cannot become occupied by the ionomer.

Depending on the particular application and depending on the desired porosity of the proton-conducting ionomer coating, it has proven to be advisable for the at least one passivated region of the surface of the catalyst particle to be located at a particle edge or at a particle corner of the catalyst particle. Therefore, a passivation reactant is needed for this that adheres, such as to steps, corners or edges of the catalyst material during its deposition; for example, one which occupies the most energetically favorable site there. Basically, the aforementioned substances can be considered for this. Rather large adsorbate molecules may be advantageous, due to geometrical effects (that is, molecules with side groups (primary sulfide R—SH, with R=methyl, ethyl, propyl, etc., or secondary sulfide R,R'—S with R=methyl, ethyl, propyl, etc., or primary R—NH2 with R=methyl, ethyl, propyl, etc., or secondary amine R,R'—NH, with R=methyl, ethyl, propyl, etc., or tertiary amine R,R',R"—N with R=methyl, ethyl, propyl, etc.).

Alternatively or additionally, the at least one passivated region of the surface of the catalyst particle may also be located at a particle facet of the catalyst particle. By a particle facet is meant a partial region of the surface of the catalyst particle which is situated away from corners, edges, or steps of the catalyst particle. For this, therefore, another passivation reactant should be deposited, for which the occupying of sites away from the edges, corners or steps, and therefore on a facet of the catalyst particle, is more energetically favorable. One will also consider several of the aforementioned substances for this. However, the platinum atoms are arranged more densely on the crystal facets (especially the particularly catalytically active {111} facets) than on the edges, corners and steps, so that smaller adsorbate molecules such as carbon monoxide (CO), hydrogen sulfide ($H_2S$) or ammonia ($NH_3$) can bind more easily and may therefore be preferable.

One simple possibility for removing the at least one passivation reactant from the catalyst particle is by furnishing thermal energy to the at least one particle carrier and/or to the catalyst particles. Hence, the particle carrier or the catalyst particles will be heated, thereby detaching the passivation reactant from the surface of the catalyst particle.

Alternatively or additionally, the passivation reactant may also be removed by applying a negative pressure, and thus a vacuum, to the at least one particle carrier and/or to the catalyst particles, whereupon after passing below a limit pressure the energy of the passivation reactant is enough to desorb from the surface of the catalyst particle.

Alternatively or additionally, the creating of a plasma at or near the at least one particle carrier and/or at the catalyst particles can also result in the detaching of the at least one passivation reactant. One will consider for this an $O_2$, a $N_2$, a $H_2$ or a $CH_x$ plasma, for example.

Alternatively or additionally, the at least one passivation reactant can also be removed by supplying at least one chemical depassivation reactant to the at least one particle carrier and/or to the catalyst particles.

In order to stabilize the ionomer polymers of the proton-conducting ionomer coating and protect them against oxidative decomposition, it has furthermore proven to be advantageous for a radical-decomposing impregnation to be applied to the at least one particle carrier and/or to the catalyst particles after the removal of the at least one passivation reactant. In this regard, an impregnation comprising a cerium salt or a cerium oxide has proven to be advantageous.

For the later formation of a membrane electrode arrangement, it has proven to be advantageous for the particle carrier laden with catalyst particles to be present in powder form and to be applied to a substrate before the proton-conducting ionomer coating is deposited thereon.

As the substrate, one may consider for example the gas diffusion layer or a microporous layer associated with the gas diffusion layer. In this way, a gas diffusion electrode (GDE) can be formed. Alternatively, however, the polymer electrolyte membrane can also be used as the substrate, thereby producing a catalyst-coated membrane (CCM).

In either case, the possibility of introducing an additional, electrically conductive but not catalytically active ionomer-coated component in the electrode furthermore exists, in order to improve the proton and water transport in the electrode. The electrically conductive component here may be, for example, an ionomer-coated carbon particle, ionomer-coated graphene, or ionomer-coated carbon nano tubes.

The electrode described herein for a fuel cell, especially for a polymer electrolyte membrane fuel cell, comprises a multitude of electrically conductive particle carriers, which carry one or more catalyst particles. Furthermore, a proton-conducting ionomer coating is present, which is bound at least partly to one or more of the catalyst particles. The proton-conducting ionomer coating is given a preselected porosity by means of a passivation reactant, the pores or channels of which are present in a predetermined or predeterminable distribution.

Thanks to this distribution of the pores, the precious metal content or the number of catalyst particles overall can be kept low, since the channels or pores assure a satisfactory material transport of the reactants of the fuel cell. At the same time, a reliable proton transport is possible, due to the cohesive, porous ionomer coating. The distribution of the pores and channels is more uniform thanks to the passivation step carried out than that of a wet-chemical production of the electrode.

It is possible for the pores to be arranged in regions of the surface of the catalyst particles on a particle edge or on a particle corner of the catalyst particle.

Alternatively or additionally, the possibility exists of arranging the pores or channels of the ionomer coating on a particle facet of the catalyst particle.

Moreover, a radical-decomposing impregnation may be applied to or introduced into the ionomer coating, so that there is a stabilization of the ionomer coating and thus a protection against oxidative decomposition.

All the described advantages and preferred embodiments for the method described herein of producing an electrode for a fuel cell also apply to the electrode described herein.

The features and combinations of features mentioned above in the description as well as the features and combinations of features mentioned hereafter in the description of the figures and/or shown solely in the figures may be used not only in the particular indicated combination, but also in other combinations or standing alone, without departing from the scope of the present disclosure. Thus, even configurations not explicitly shown or explained in the figures, yet which emerge from and can be created from the discussed configurations by separate combinations of features, are to be regarded as encompassed by and disclosed by the present disclosure.

BRIEF DESCRIPTION OF THE SEVERAL VIEWS OF THE DRAWINGS

Further advantages, features and details are provided in the following detailed description and the drawings.

DETAILED DESCRIPTION

Figure 1:
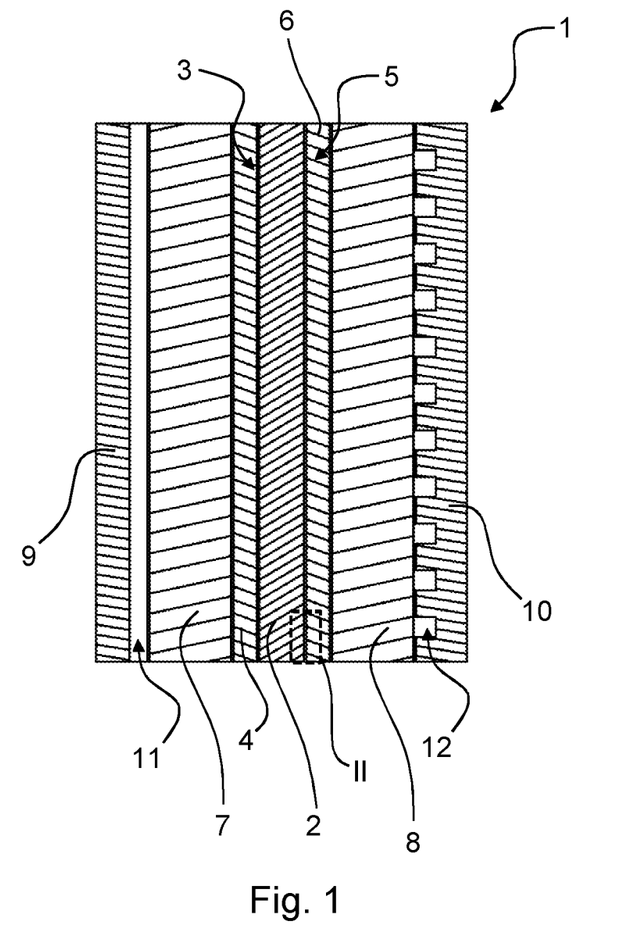
FIG. 1 shows a schematic cross sectional view of a fuel cell with an electrode.
Figure 2:
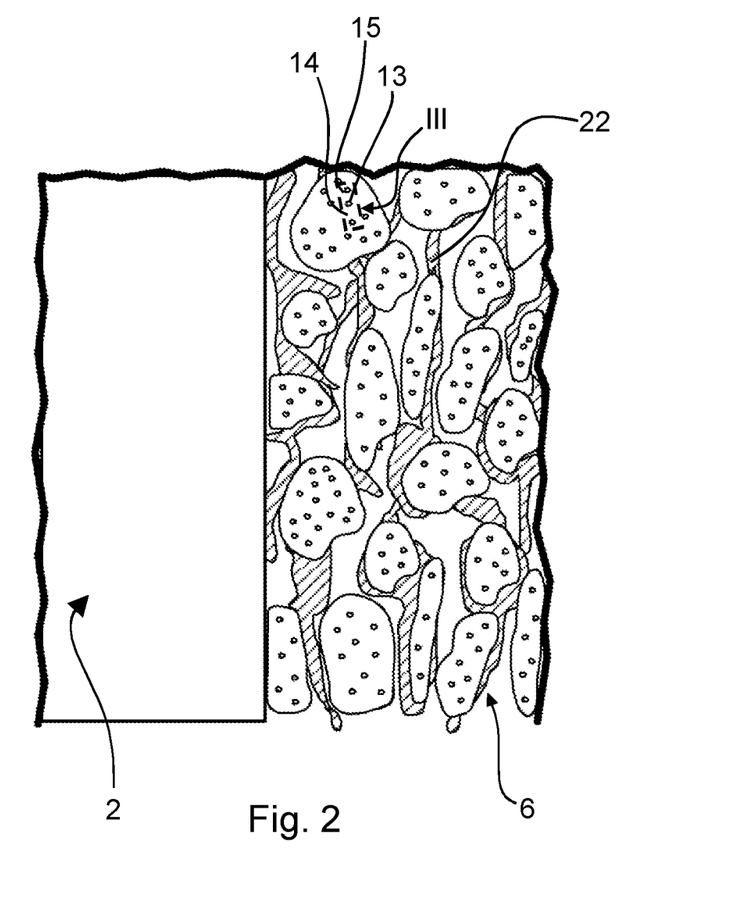
FIG. 2 shows a schematically represented detail view of an electrode.

FIG. 1 shows a fuel cell 1. A semipermeable membrane 2 here is covered on a first side 3 by a first electrode 4, in this case the anode, and on a second side 5 by a second electrode 6, in this case the cathode. The first electrode 4 and the second electrode 6 comprise particle carriers 14, on which are arranged or carried catalyst particles 13 of precious metals or mixtures containing precious metals such as platinum, palladium, ruthenium or the like (FIG. 2). These catalyst particles 13 serve as reaction accelerants in the electrochemical reaction of the fuel cell 1. The particle carriers 14 may contain carbon. But particle carriers 14 formed from a metal oxide may also be considered. In such a polymer electrolyte membrane fuel cell (PEM fuel cell), fuel or fuel molecules, especially hydrogen, are split into protons and electrons at the first electrode 5 (anode). The membrane 2 lets through the protons (such as $H^+$), but is impermeable to the electrons ($e^-$). The membrane 2 is formed from an ionomer, such as a sulfonated tetrafluoroethylene polymer (PTFE) or a polymer of perfluorinated sulfonic acid (PFSA). The following reaction will occur at the anode: $2H_2 \rightarrow 4H^+ + 4e^-$ (oxidation/electron donation).

While the protons pass through the membrane 2 and go to the second electrode 6 (cathode), the electrons are taken by an external circuit to the cathode or to an energy accumulator. At the cathode, a cathode gas is provided, especially oxygen or air containing oxygen, so that the following reaction will take place here: $O_2 + 4H^+ + 4e^- \rightarrow 2H_2O$ (reduction/electron uptake).

In the present case, the electrodes 4, 6 are each associated with a gas diffusion layer 7, 8, the one gas diffusion layer 7 being associated with the anode and the other gas diffusion layer 8 with the cathode. Furthermore, the anode-side gas diffusion layer 7 is associated with a bipolar plate 9 for furnishing the fuel gas, having a fuel flow field 11. By means of the fuel flow field 11, the fuel is supplied through the gas diffusion layer 7 to the electrode 4. At the cathode side, the gas diffusion layer 8 is associated with a bipolar plate 10 comprising a cathode gas flow field 12 for supplying the cathode gas to the electrode 6.

The composition or the construction of the electrodes 4, 6 can be seen more closely in FIG. 2, which is detail II-II of FIG. 1, showing in particular the cathode-side electrode 6 more closely. It should be noted that the electrodes 4, 6 may also be present as an integrated component of the gas diffusion layers 7, 8, namely, in the form of a microporous layer 21 (MPL). The electrodes 4, 6 in the present case are formed from a multitude of catalyst particles 13, which are formed for example from platinum or a platinum alloy. But the catalyst particles 13 may be nanoparticles, which may be formed for example as "core-shell nanoparticles". These have the benefit of a large surface, the precious metal or the precious metal alloy being situated only on the surface, while a metal of lesser value, such as nickel or copper or an alloy of these metals, forms the core of the nanoparticle.

The catalyst particles 13 are arranged or carried on a multitude of electrically conductive particle carriers 14. Furthermore, an ionomer binder 22 is present between the particle carriers 14 and/or the catalyst particles 13, which may be formed from the same material as the membrane 2. The ionomer binder 22 is porous and has a porosity in the chosen representation of more than 30 percent. The possibility also exists of the ionomer binder 22 having a distinctly lower porosity, so that the electrically conductive catalyst particles 13 are bonded together more strongly in proton-conducting manner. The formation of a porous ionomer binder 22 ensures, especially on the cathode side, that the oxygen diffusion resistance is not increased and therefore a lesser load of precious metal for the catalyst particle 13 or a lesser load of catalyst particles 13 for the particle carrier 14 becomes possible. Instead of or in addition to the use of an ionomer binder 22, the particle carrier 14 and the catalyst particles 13 may also be joined together by means of a proton-conducting ionomer coating 15, as will be discussed more closely below with the aid of the detail feature III.

Figure 3:
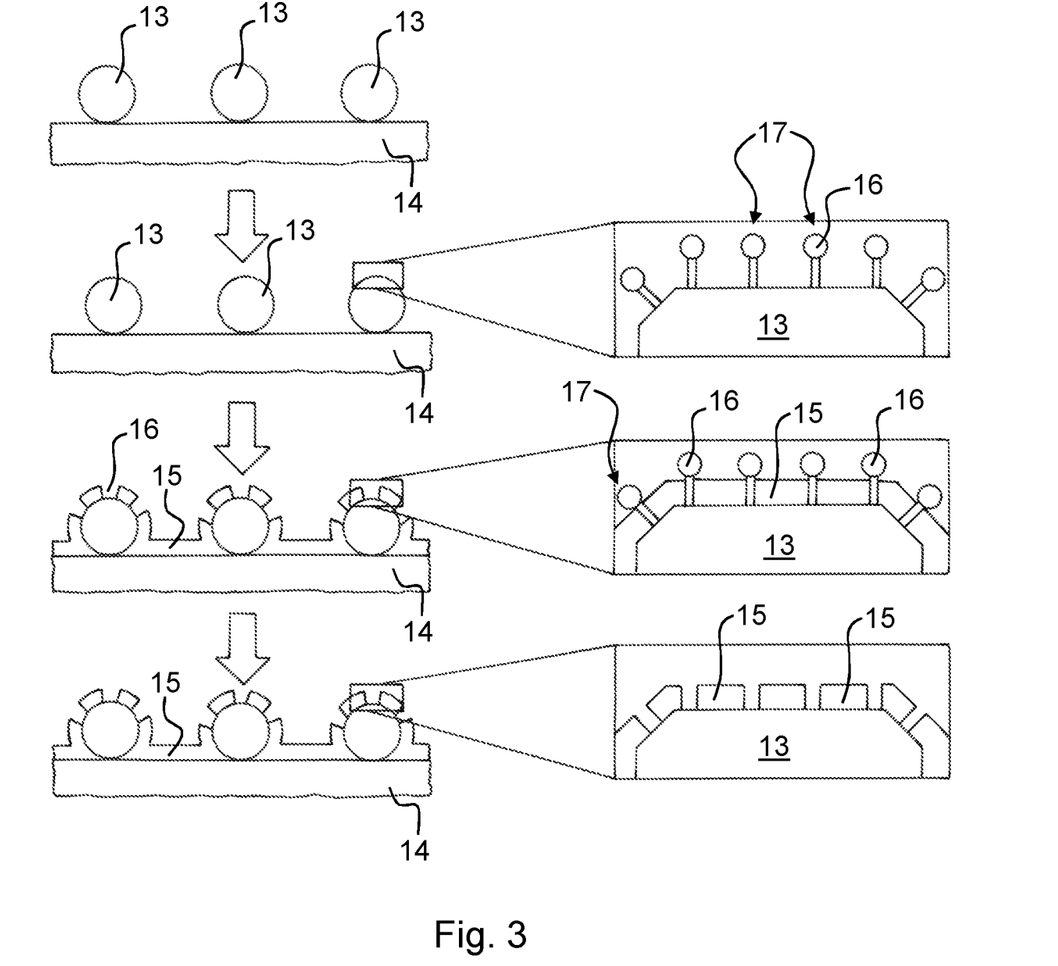
FIG. 3 shows an illustration of the production of an electrode.

FIG. 3 illustrates the production of the electrodes 4, 6. First of all, a multitude of catalyst particles 13 carried on the electrically conductive particle carrier 14 is prepared. The particle carrier 14 in the present case thus forms the substrate for the catalyst particles 13. The surface of the catalyst particles 13 is then selectively passivated. For this, atoms or molecules of at least one passivation reactant 16 are deposited from the gas phase onto a surface of the catalyst particles 13. In this way, one or more passivated regions 17 are created on the surface of the catalyst particles 13. The atoms or molecules of the passivation reactant 16 occupy sites on the catalyst particle 13 which can no longer be occupied during the subsequent deposition of multiple atomic or molecular layers of an ionomer from the gas phase. A proton-conducting ionomer coating 15 deposited from the gas phase is applied in the third step of the process. The deposition is done away from the at least one passivated region 17 of the surface of the catalyst particle 13. Finally, the at least one passivation reactant 16 is removed from the catalyst particles 13, thereby forming the proton-conducting ionomer coating 15 with an adjustable porosity.

Figure 4:
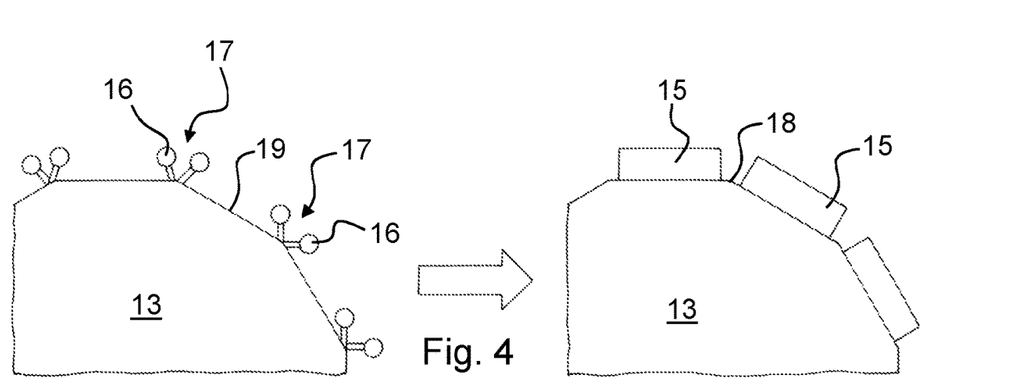
FIG. 4 shows an illustration of the specific passivation of crystal corners and edges of the catalyst particle.

With the aid of FIG. 4, it can be seen that the passivation reactant 16 is deposited during the passivation step on a particle edge 18 or a particle corner, so that channels or pores are formed in the proton-conducting ionomer coating 15 after applying the proton-conducting ionomer coating 15 and after removing the passivation reactant 16, leading to these particle edges 18 or particle corners of the catalyst particles 13. In other words, the proton-conducting ionomer coating 15 covers the particle facets 19 of the catalyst particles 13.

Figure 5:
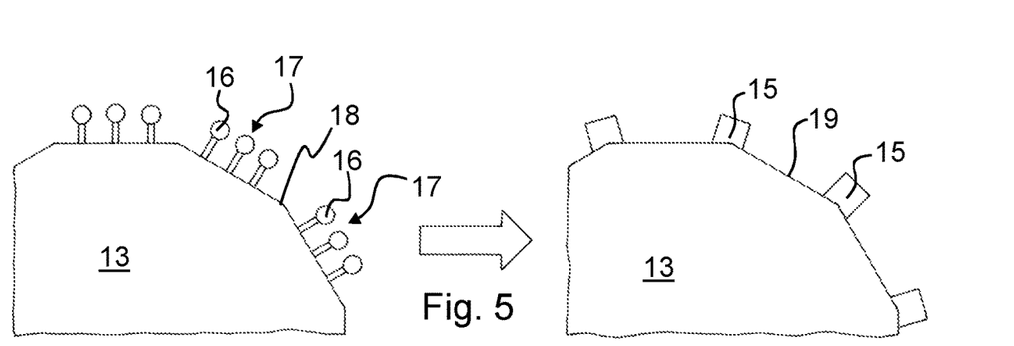
FIG. 5 shows an illustration of the specific passivation of crystal facets of the catalyst particle.

In FIG. 5, a passivation reactant 16 is used for the passivation which is adsorbed on the particle facets 19 of the catalyst particle 13. After applying the proton-conducting ionomer coating 15 and after removing the passivation reactant 19, an electrode 4, 6 is obtained in which the proton-conducting ionomer coating 15 covers only the particle edges 18 or corners.

Figure 6:
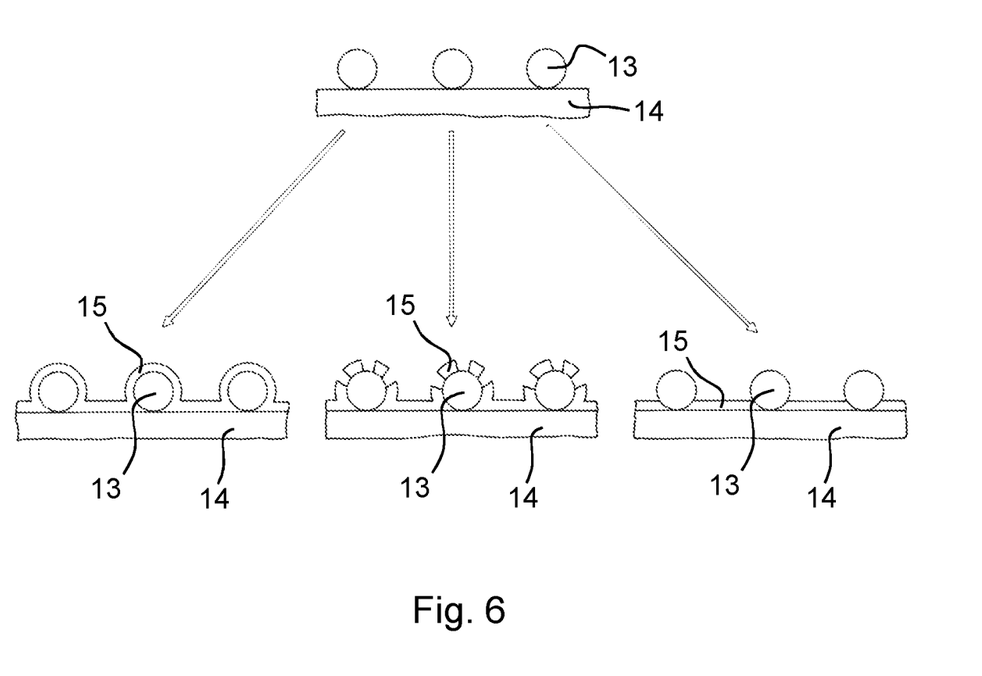
FIG. 6 shows an illustration of the production of the electrode with different configurations of proton-conducting ionomer coatings.

FIG. 6 shows the production of an electrode 4, 6, during which in the left picture a nonporous proton-conducting ionomer coating 15 or one with a low level of porosity of at most five percent is deposited on the catalyst particles 13 and their particle carrier 14. Since the ionomer coating 15 is deposited layer by layer, the layer thickness of the ionomer coating 15 can be adjusted arbitrarily by means of one cycle or by means of several cycles of a chemical gas phase deposition, especially by means of several cycles of a molecular layer deposition. This may amount to between individual molecular layers (monolayers) and 20 nanometers (nm) or 30 nanometers. Yet FIG. 6 shows not only that different layer thicknesses are possible for the ionomer coating 15, but also that different levels of porosity are possible, depending on the use of the passivation reactant 16 or depending on the covering of the surface of the catalyst particles 13. The middle illustration shows a porosity between 30 percent and 50 percent at the ionomer coating 15, which is located on the surface of the catalyst particle 13. This porosity should also be understood as being a low or medium passivation, for which a thin homogeneous ionomer layer is present on the substrate and a porous layer on the catalyst particles 13. At the right side of the illustration of FIG. 6 is shown a very strong passivation, for which the catalyst particles 13 remain largely free from the ionomer coating 15 and only the particle carrier 14 is coated accordingly.

Figure 7:
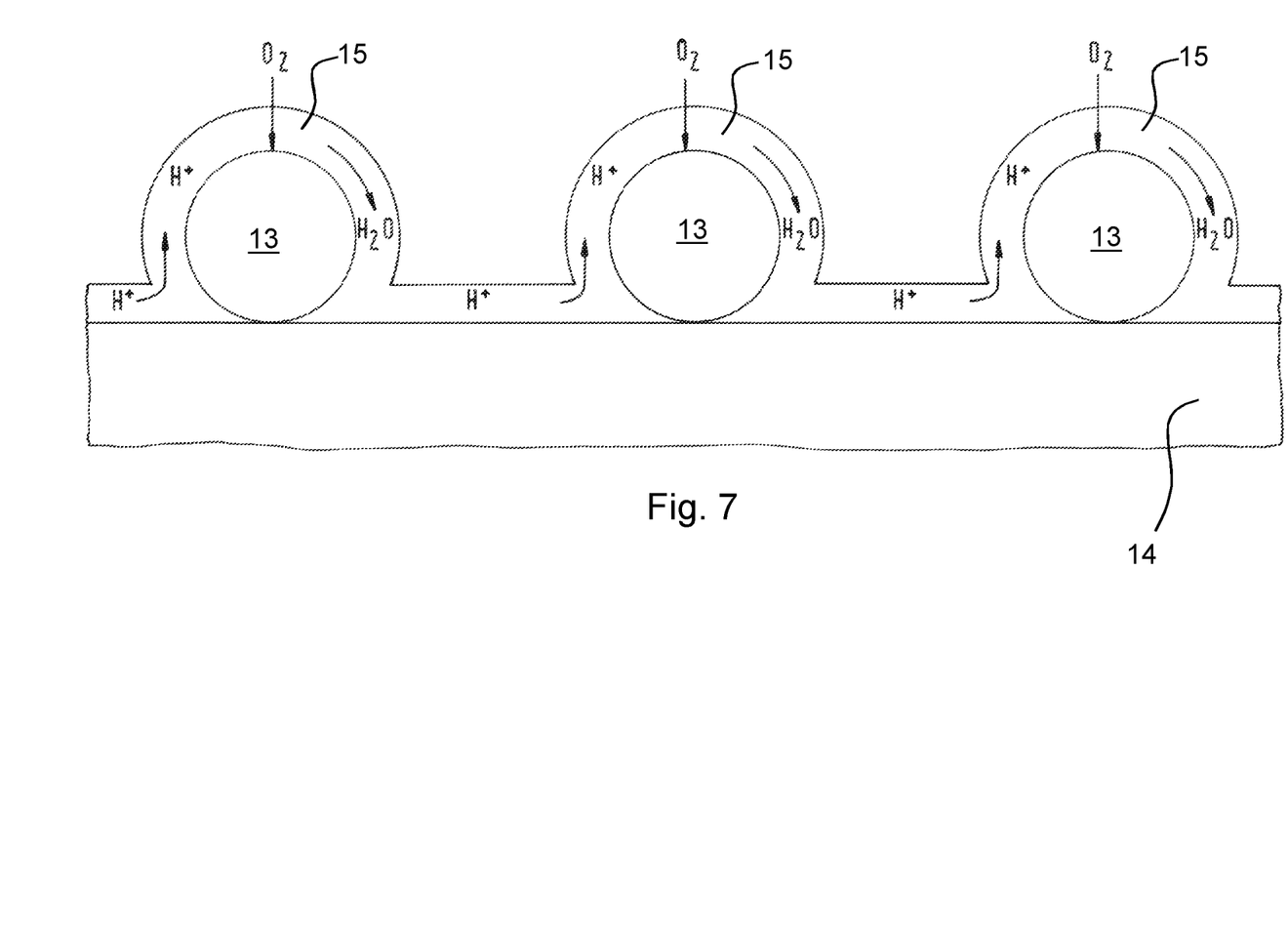
FIG. 7 shows an illustration of an electrode with a proton-conducting ionomer coating formed as a thin layer.

FIG. 7 shows an electrode 4, 6 in which the particle carrier 14 and the catalyst particles 13 are coated with a thin layer of an ionomer coating 15, having little or no porosity. Furthermore, the transport mechanisms of the reactants, protons and the product water are shown for such an ionomer coating 15.

Figure 8:
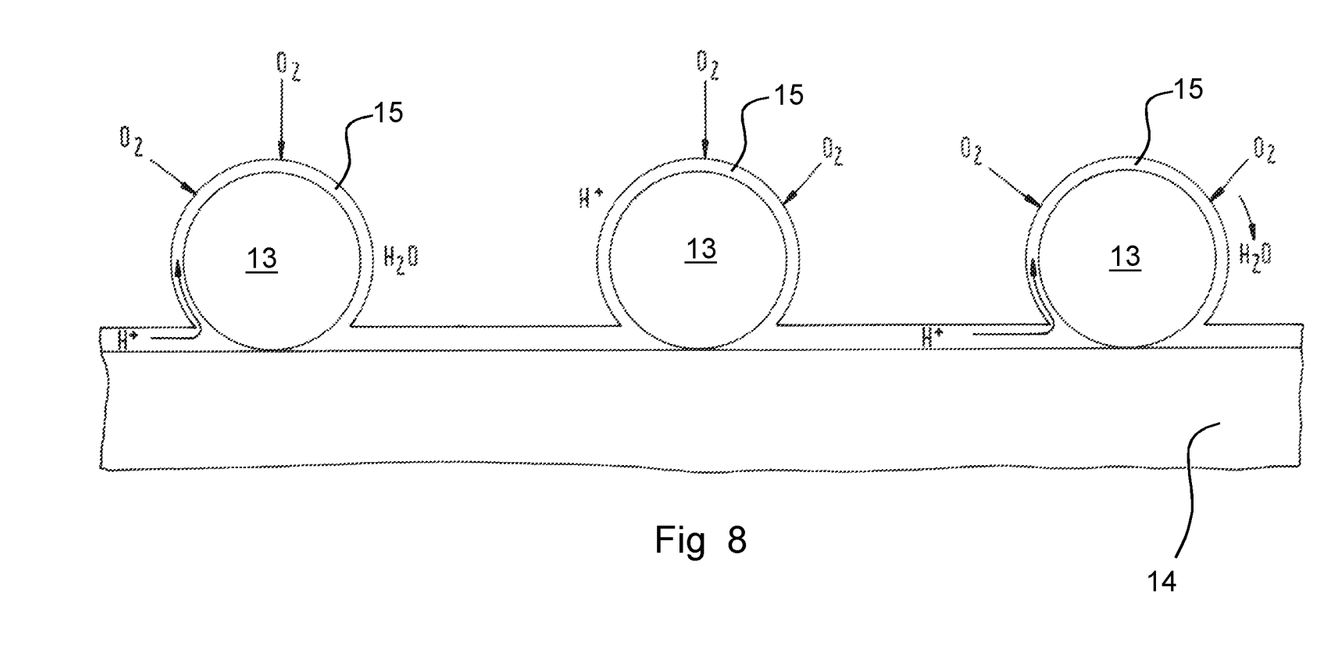
FIG. 8 shows an illustration of an electrode with a proton-conducting ionomer coating formed as an ultra-thin layer.

FIG. 8 shows an embodiment of an ionomer coating 15 as an ultra-thin layer, likewise having little or no porosity. This ultra-thin proton-conducting ionomer coating 15 may consist, for example, of only one monolayer. Furthermore, the transport mechanisms of the reactants, protons and the product water are shown for such an ionomer coating 15.

Figure 9:
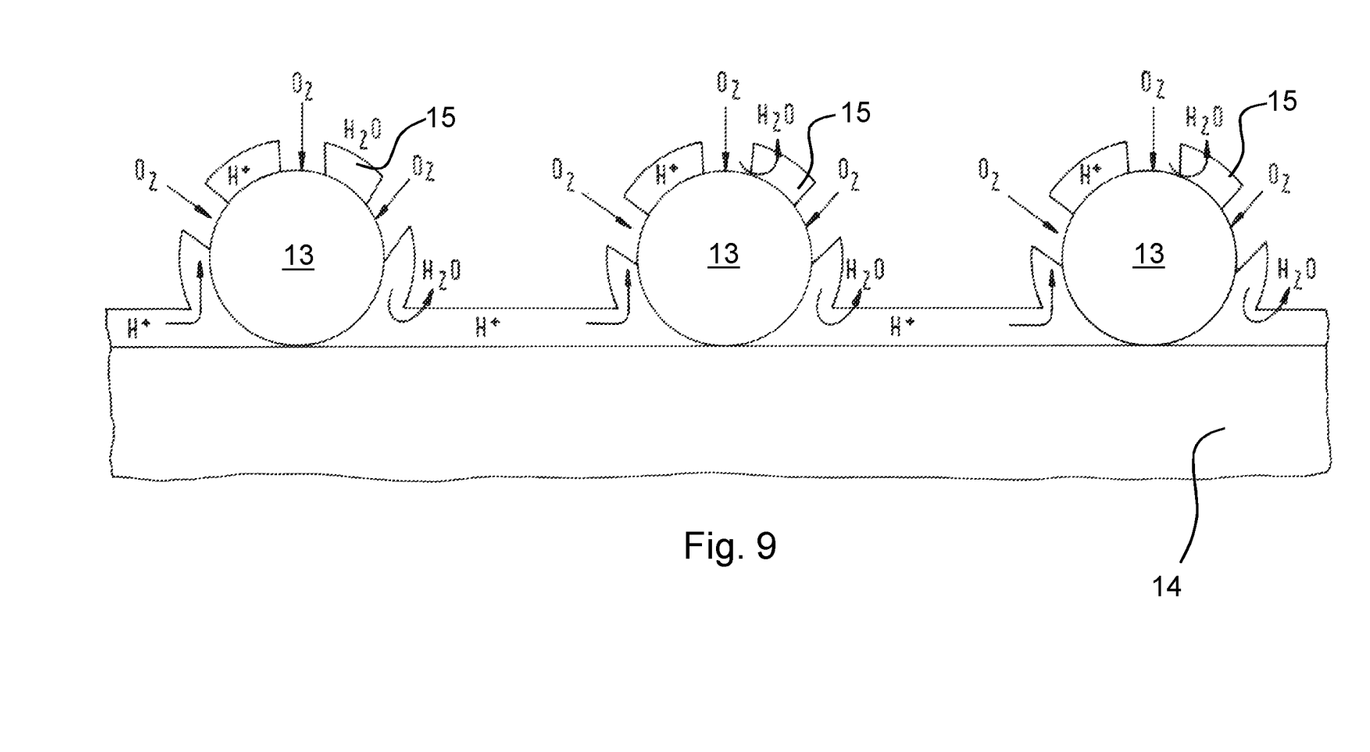
FIG. 9 shows an illustration of an electrode with a proton-conducting ionomer coating having high porosity and formed as a thin layer.

FIG. 9 shows the ionomer coating 15 provided with a high porosity. Furthermore, the transport mechanisms of the reactants, protons and the product water are shown for such an ionomer coating 15.

Figure 10:
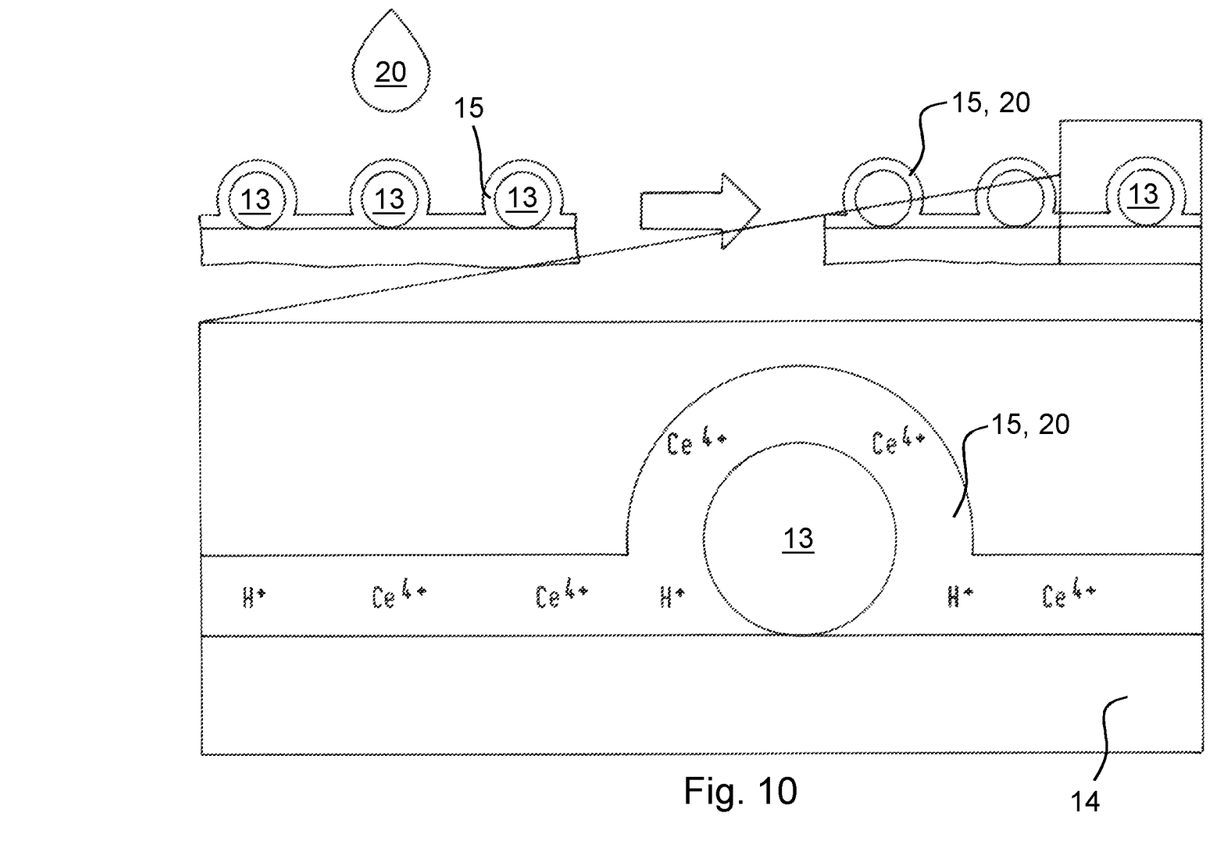
FIG. 10 shows an illustration of the process step of subsequent impregnation with $Ce^{4+}$.

For all of the above discussed embodiments, the possibility is furthermore opened up of applying a radical-decomposing impregnation 20 after the removal of the at least one passivation reactant 16 on the at least one particle carrier 14 and/or the catalyst particles 13, as is shown more closely in FIG. 10. In the present instance, it is proposed to use an impregnation 20 comprising a cerium salt or a cerium oxide (in the present case, the impregnation is done with $Ce^{4+}$).

Figure 11:
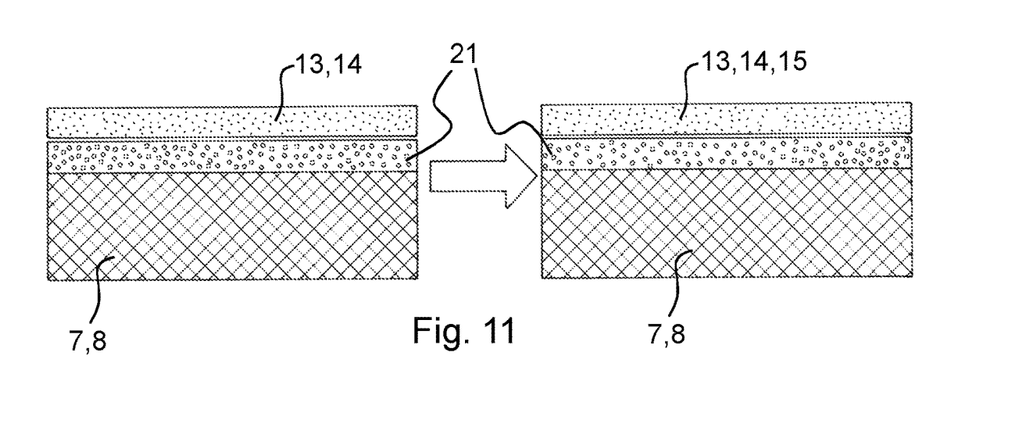
FIG. 11 shows an illustration of the production of a gas diffusion electrode (GDE).

FIG. 11 shows a gas diffusion electrode for which the particle carriers 14 laden with the catalyst particles 13 are present at first in a powder form and are applied to a substrate, in the present case to the microporous layer 21. The powder may also be consolidated beforehand or bound by means of a suitable binder. After this, the powder is passivated with one or more passivation reactants 16—possibly different ones. Next comes the deposition of the ionomer coating 15. The one or more passivation reactants 16 are then removed, thereby forming the corresponding porosity in the ionomer coating 15. This results in a porous and thus high-performance gas diffusion electrode (GDE).

Figure 12:
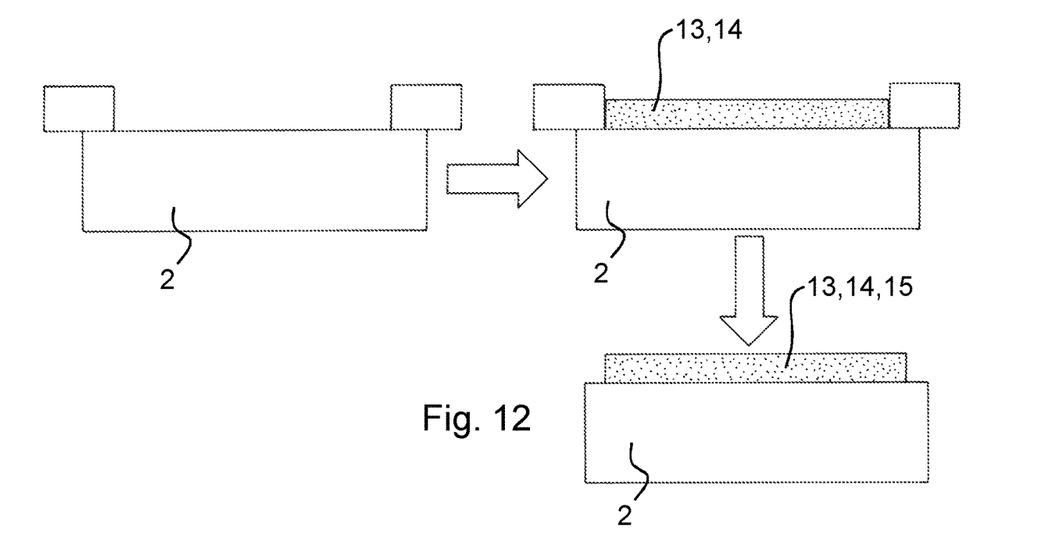
FIG. 12 shows an illustration of the production of a catalyst-coated membrane (CCM).

FIG. 12 shows the possibility of the particle carriers 14 laden with the catalyst particles 13 also being present in powder form and being applied to the polymer electrolyte membrane 2. In order to keep the powder in the desired place, a frame is used in the present case. Here as well the next step is the passivation with one or more—possibly different—passivation reactants 16. The proton-conducting ionomer coating 15 is then deposited from the gas phase. The passivation reactants 16 used for the passivation are then removed, here as well. This results in a high-performance catalyst-coated membrane 2 (CCM).

In summary, embodiments of the present invention provide the advantage that, despite a lesser precious metal loading of the particle carrier 14 or a lower precious metal fraction in the catalyst particle 13, little or no loss of performance occurs on account of less increase in the oxygen resistance around the reaction zone. Furthermore, embodiments of the invention provide a preparation method for the production of the electrodes 4, 6 having a distinct time savings on account of lower drying times as compared to wet-chemical production methods.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for the production of an electrode for a fuel cell, comprising:
   providing of a plurality of catalyst particles carried on at least one electrically conductive particle carrier; and
   depositing one or more atomic or molecular layers of an ionomer from the gas phase on the catalyst particles and/or the at least one particle carrier, thereby forming a proton-conducting ionomer coating.

2. The method according to claim 1, further comprising:
   depositing atoms or molecules of at least one passivation reactant on the on a surface of the catalyst particles, thereby forming at least one passivated region on the surface of the catalyst particles prior to forming the proton-conducting ionomer coating;
   depositing the proton-conducting ionomer coating away from the at least one passivated region of the surface of the catalyst particle; and
   removing the at least one passivation reactant from the catalyst particles, thereby forming the proton-conducting ionomer coating having a porosity.

3. The method according to claim 2, wherein the at least one passivation reactant is chosen from a group comprising carbon monoxide, cyanide ions, thiocyanate, isothiocyanate, sulfide, hydrogen sulfide, amine and ammonia.

4. The method according to claim 2, wherein, the at least one passivated region of the surface of the catalyst particle is located at a particle edge or at a particle corner of the catalyst particle.

5. The method according to claim 2, wherein the at least one passivated region of the surface of the catalyst particle is located at a particle facet of the catalyst particle.

6. The method according to claim 2, wherein the at least one passivation reactant is removed by furnishing thermal energy to the at least one particle carrier and/or to the catalyst particles.

7. The method according to claim 2, wherein the at least one passivation reactant is removed by applying a vacuum to the at least one particle carrier and/or to the catalyst particles.

8. The method according to claim 2, wherein the at least one passivation reactant is removed by creating a plasma at the at least one particle carrier and/or at the catalyst particles.

9. The method according to claim 2, wherein the at least one passivation reactant is removed by supplying at least one chemical depassivation reactant to the at least one particle carrier and/or to the catalyst particles.

10. The method according to claim 2, wherein, after the removal of the at least one passivation reactant a radical-decomposing impregnation is applied to the at least one particle carrier and/or to the catalyst particles.

11. The method according to claim 10, wherein the impregnation comprises a cerium salt or a cerium oxide.

12. The method according to claim 1, wherein the particle carrier laden with the catalyst particles is present in powder form and is applied to a substrate before the proton-conducting ionomer coating is deposited thereon.

13. An electrode for a fuel cell, comprising:
a multitude of electrically conductive particle carriers, each of the electrically conductive particle carriers carrying one or more catalyst particles and having a proton-conducting ionomer coating bound at least partly to one or more of the catalyst particles,
wherein the proton-conducting ionomer coating is given a preselected porosity by a passivation reactant, the pores or channels of which are present in a predetermined or predeterminable distribution.

* * * * *

UNITED STATES PATENT AND TRADEMARK OFFICE
CERTIFICATE OF CORRECTION

| | | |
|---|---|---|
| PATENT NO. | : 12,009,526 B2 | Page 1 of 1 |
| APPLICATION NO. | : 17/425693 | |
| DATED | : June 11, 2024 | |
| INVENTOR(S) | : Thomas Schladt et al. | |

It is certified that error appears in the above-identified patent and that said Letters Patent is hereby corrected as shown below:

In the Claims

Column 8, Claim 2, Line 50:
"reactant on the on a surface"
Should read:
--reactant on a surface--.

Column 8, Claim 4, Line 64:
"claim 2, wherein, the at least"
Should read:
--claim 2, wherein the at least--.

Column 9, Claim 10, Line 21:
"reactant a"
Should read:
--reactant, a--.

Signed and Sealed this
Twenty-ninth Day of April, 2025

Coke Morgan Stewart
*Acting Director of the United States Patent and Trademark Office*